(12) United States Patent
Tso

(10) Patent No.: US 7,742,987 B2
(45) Date of Patent: Jun. 22, 2010

(54) USING CURRENCY TO PURCHASE FROM SELLERS THAT DO NOT RECOGNIZE THE CURRENCY

(75) Inventor: Michael M. Tso, Saratoga, CA (US)

(73) Assignee: Invenda Corporation, Bethesda, MD (US)

( * ) Notice: Subject to any disclaimer, the term of this patent is extended or adjusted under 35 U.S.C. 154(b) by 0 days.

(21) Appl. No.: 11/925,137

(22) Filed: Oct. 26, 2007

(65) Prior Publication Data

US 2008/0046360 A1  Feb. 21, 2008

Related U.S. Application Data

(62) Division of application No. 09/854,423, filed on May 10, 2001.

(60) Provisional application No. 60/203,422, filed on May 10, 2000.

(51) Int. Cl.
G06Q 40/00 (2006.01)
(52) U.S. Cl. .......................... 705/39; 705/40
(58) Field of Classification Search .............. 705/39–40
See application file for complete search history.

(56) References Cited

U.S. PATENT DOCUMENTS 4,968,873 A * 11/1990 Dethloff et al. ............. 235/380
6,061,660 A * 5/2000 Eggleston et al. ............. 705/14

FOREIGN PATENT DOCUMENTS

| EP | 0 949 596 | 10/1999 |
| GB | 2 319 381 | 5/1998 |
| WO | WO 97/48078 | 12/1997 |
| WO | WO 00/31685 | 6/2000 |

OTHER PUBLICATIONS

U.S. Appl. No. 09/854,423, filed May 2001, Tso, Michael.*

* cited by examiner

*Primary Examiner*—Thu Thao Havan
(74) *Attorney, Agent, or Firm*—Pillsbury Winthrop Shaw Pittman LLP

(57) ABSTRACT

Processing transactions involving participants that do not support the same currency generally involves incrementing and decrementing currencies associated with the participants. This allows the participants to participate in transactions where they would not ordinarily be able to do so. A request is received from a first participant to process a transaction using a first currency that is not recognized by a second participant in the transaction. In response to receiving the request from the first participant, an amount of the first currency associated with the first participant is decremented. Also in response to receiving the request from the first participant, an amount of second currency associated with the first participant is incremented. The second participant recognizes the second currency. The transaction is processed using the amount of second currency associated with the first participant.

23 Claims, 3 Drawing Sheets

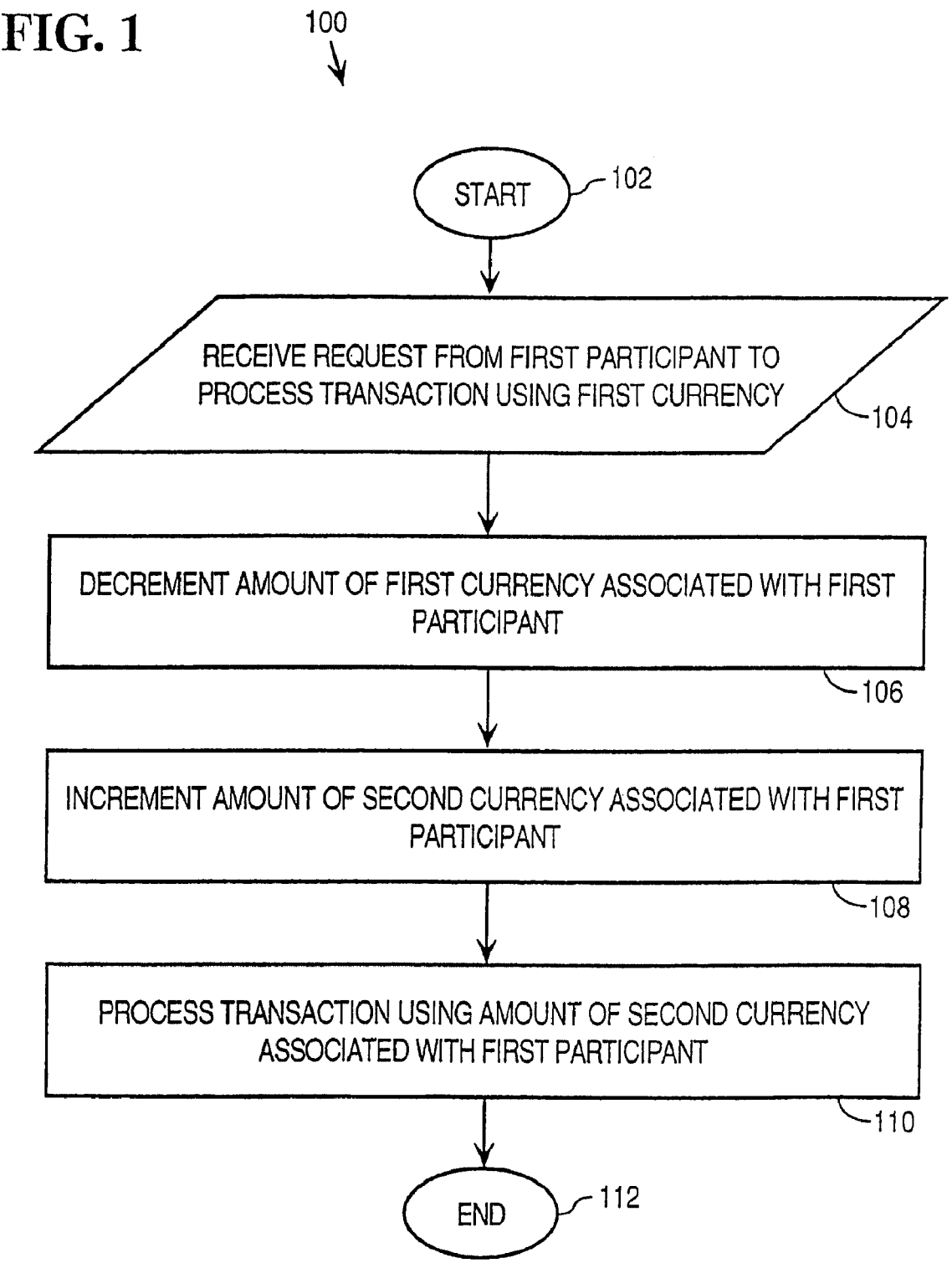

USING CURRENCY TO PURCHASE FROM SELLERS THAT DO NOT RECOGNIZE THE CURRENCY

CROSS-REFERENCE TO RELATED APPLICATIONS

This Application is a division of U.S. patent application Ser. No. 09/854,423, filed May 10, 2001, which claims priority to U.S. Provisional Patent Application Ser. No. 60/203,422, filed May 10, 2000, each of which is hereby incorporated by reference herein in its entirety.

FIELD OF THE INVENTION

The present invention relates generally to information management, and more specifically, to an approach for processing transactions involving private currency.

BACKGROUND OF THE INVENTION

Many types of "private currencies" are currently in use. A private currency refers to anything, controlled by a non-sovereign entity, which can be used to "purchase" all or part of some good or service. A vendor is said to "recognize" a private currency if the vendor accepts the private currency as payment, or partial payment, for a good or service. One example of a private currency is "frequent flyer miles" awarded by airlines that may be used in lieu of, or in combination with, legal tender to pay for airfares. As another example, many cereal companies allow children to purchase toys using "proof of purchase" coupons from cereal boxes. As yet another example, many Internet-based companies award points to users for viewing advertisements or visiting particular sites and allow the points to be spent on selected items.

Typically, a company that employs private currency does so to create an incentive for individuals to perform certain acts that benefit the company. Since those acts only benefit the company, the company that controls the private currency is frequently the only entity that recognizes the private currency. For example, one airline typically will not recognize frequent flyer miles that have been granted by a competing airline. Similarly, airfares typically cannot be purchased with "proof of purchase" coupons off cereal boxes of unrelated companies.

To increase the value of a private currency, a company that controls the private currency may enter agreements with other companies, contractually obligating those other companies to recognize, at least under certain conditions, the value of their private currency. However, such arrangements may be difficult and costly to negotiate, monitor and maintain.

The perceived value of private currency is significantly diminished due to the extremely limited number of sources that recognize the currency. For example, it is not uncommon for recipients of private currency to consider it worthless because they are not interested in anything on which it may be spent. If a private currency is considered to be of little value by those for whom it is supposed to be an incentive, it has ceased to serve its purpose.

Based on the foregoing, an approach for processing transactions that allows a participant to use private currency that is not recognized by another participant in the transaction is highly desirable.

SUMMARY OF THE INVENTION

According to one aspect of the invention, a method is provided for processing a transaction. The method includes receiving, from a first participant in the transaction, a request to process the transaction using a first currency that is not recognized by a second participant in the transaction. In response to receiving the request from the first participant, an amount of the first currency associated with the first participant is decremented and an amount of second currency associated with the first participant is incremented, wherein the second currency is recognized by the second participant. The transaction is then processed using the amount of second currency associated with the first participant.

According to another aspect of the invention, an apparatus is provided for processing a transaction. The apparatus comprises an input/output mechanism and a transaction processor communicatively coupled to the input/output mechanism. The input/output mechanism is configured to receive, from a first participant in the transaction, a request to process the transaction using a first currency that is not recognized by a second participant in the transaction. The transaction processor is configured to in response to receiving the request from the first participant, decrement an amount of the first currency associated with the first participant, and increment an amount of second currency associated with the first participant, wherein the second currency is recognized by the second participant. The transaction processor is further configured to process the transaction using the amount of second currency associated with the first participant.

According to another aspect of the invention, a method is provided for allowing a user to use private currency provided by a particular entity to make purchases from a vendor that does not recognize the private currency. According to the method a first account and a second account are established for the user. The first account indicates an amount of the private currency and the second account indicates an amount for a type of currency that is recognized by the vendor. The user expresses an interest in making a purchase from the vendor. Based on an exchange formula, the amount in the first account is decremented and the amount in the second account is incremented. Finally, the currency from the second account is used to pay for at least part of the purchase.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 1 is a flow diagram of an approach for processing a transaction according to an embodiment of the invention;

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects of the invention are described in more detail hereinafter in the following sections: (1) functional overview; (2) architecture overview; (3) determining currency amounts; (4) atomic transactions; and (5) implementation mechanisms.

1. Functional Overview

FIG. 1 is a flow diagram 100 of an approach for processing a transaction according to an embodiment of the invention. After starting in step 102, in step 104, a request is received from a first participant to process a transaction using a first currency that is not recognized by a second participant in the transaction. In response to receiving the request from the first participant, in step 106, an amount of the first currency associated with the first participant is decremented. Also in response to receiving the request from the first participant, in step 108, an amount of second currency associated with the first participant is incremented. The second currency is recognized by the second participant. In step 110, the transaction is processed using at least a portion of the amount of second currency associated with the first participant. The process is complete in step 112. The foregoing approach allows the participants to use the first currency in transactions where they would not ordinarily be able to do so.

2. Architecture Overview

Figure 2A:
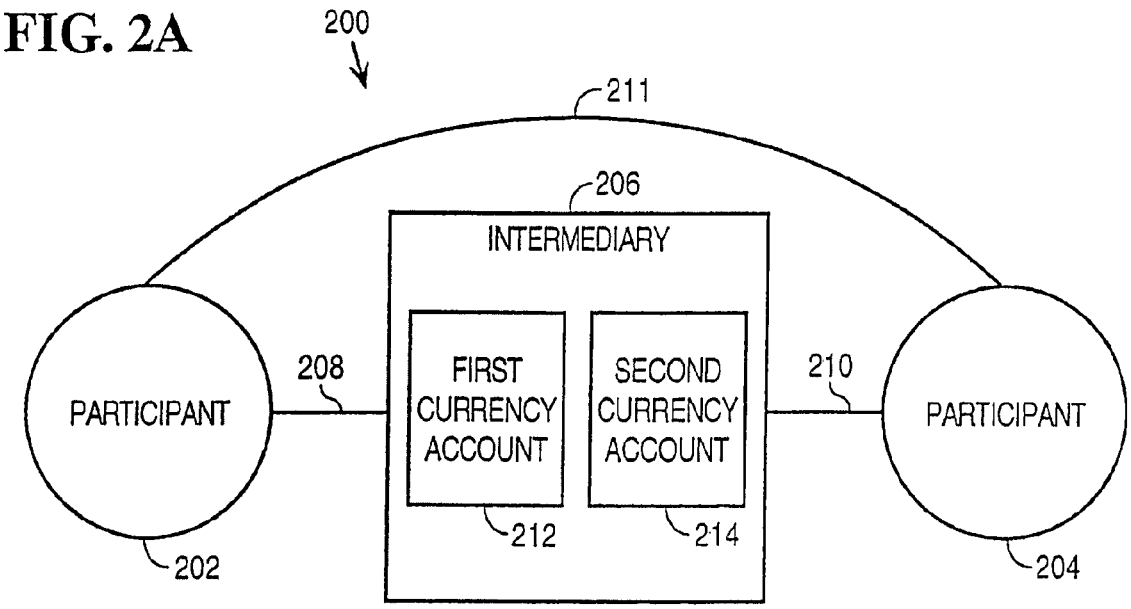
FIG. 2A is a block diagram of an arrangement for processing transactions according to an embodiment of the invention.

FIG. 2A is a block diagram of an arrangement 200 for processing transactions according to an embodiment of the invention. Arrangement 200 includes participants 202, 204 and an intermediary 206. Participant 202 is communicatively coupled to intermediary 206 via a communications link 208. Participant 204 is communicatively coupled to intermediary 206 via a communications link 210. Communications links 208, 210 may be implemented by any medium or mechanism that provides for the exchange of data between participant 202 and intermediary 206 and between participant 204 and intermediary 206, respectively. Examples of communications links 208, 210 include, without limitation, any number of networks, such as Local Area Networks (LANs), Wide Area Networks (WANs), Ethernets or the Internet, or one or more terrestrial, satellite or wireless links.

Participant 202 desires to be involved in a transaction with 204. In the present example, participant 202 desires that the transaction be processed using a first currency. Participant 204 recognizes a second currency, but not the first currency. Participant 202 sends to intermediary 206, over communications link 208, a request to process a transaction using the first currency. In response to receiving the request from participant 202, intermediary 206 performs two functions. First, intermediary 206 decrements an amount of first currency associated with participant 202. Intermediary 206 also increments an amount of second currency associated with participant 202. As previously described, the second currency is recognized by participant 204. The transaction is then processed using at least a portion of the amount of second currency associated with participant 202. Thus, the transaction is processed in the currency that each participant 202, 204 recognizes. That is, from the perspective of participant 202, the transaction is processed using the first currency. Similarly, from the perspective of participant 204, the transaction is processed using the second currency. Participants 202, 204 may also communicate directly with each other for a variety of purposes, for example to negotiate transaction fulfillment information.

For purposes of explanation, embodiments of the invention are described in the context of processing transactions involving two participants, namely participants 202, 204. The invention, however, is not limited to any particular number of participants. For example, according to one embodiment of the invention, participant 202 generates and provides to intermediary 206, a request to process a second transaction with third participant (not illustrated) using the first currency. In this example, the third participant does not recognize the first currency but recognizes a third currency. In response to receiving the request from the first participant, intermediary 206 decrements an amount of the first currency associated with participant 202. Intermediary 206 also increments an amount of third currency associated with participant 202. The transaction is then processed using at least a portion of the amount of third currency associated with participant 202.

3. Determining Currency Amounts

The amount of first and second currencies associated with participant 202 that are decremented and incremented, respectively, may be determined in a variety of ways and the invention is not limited to any particular approach. According to one embodiment of the invention, the amount of second currency that is incremented is based upon the amount of first currency that is decremented, which may be selected by participant 202.

Consider the following example. Suppose that the first currency is a private currency, such as frequent flyer miles for a particular airline. Suppose further that participant 202 wishes to use some or all of their accumulated frequent flyer miles to purchase a particular product or service from participant 204. Participant 204 does not recognize the frequent flyer miles of the particular airline as currency. In this example, participant 202 requests that the transaction be processed using the first currency, i.e., using some or all of their accumulated frequent flyer miles with the particular airline. The request may be generated in a variety of ways and the invention is not limited to any particular approach for generating the request. For example, participant 202 may use a generic Web browser executing on a client to view a Web page containing a "buy with frequent flyer miles" button. Participant's 202 selection of the "buy with frequent flyer miles" button causes a request to process the transaction using participant's 202 accumulated frequent flyer miles with the particular airline to be generated and sent to intermediary 206.

In response to receiving the request from participant 202, intermediary 206 determines the amount of frequent flyer miles that are required to process the transaction and decrements an amount of the frequent flyer miles (first currency) associated with participant 202. Alternatively, the request from participant 202 may specify an amount of the frequent flyer miles to be used for the transaction. For example, the Web page viewed by participant 202 may specify the number of frequent flyer miles required to purchase a particular product or service. Intermediary 206 determines a corresponding amount of the second currency to be incremented in association with participant 202. The transaction is then processed using at least a portion of the amount of second currency associated with participant 202. For example, if the second currency is United States Dollars (USD), intermediary determines an amount of USDs to be incremented for participant 202.

According to one embodiment of the invention, intermediary 206 maintains first and second currency accounts 212, 214, respectively, for participant 202. First currency account 212 maintains the amount of first currency associated with participant 202. Second currency account 214 maintains the amount of second currency associated with participant 202. Thus, in the prior example, the amount of first currency associated with participant 202 that is decremented is decremented from first currency account 212. Conversely, the amount of second currency associated with participant 202 that is incremented Is incremented to second currency account 214. The transaction is processed using second currency account 214. For example, participant 204 may be given authority to process a transaction using second currency from second currency account 214.

The particular approach used to determine the amounts of first and second currency associated with participant 202 that are to be decremented and incremented, respectively, may vary depending upon the requirements of a particular application and the invention is not limited to any particular approach. For example, a conversion formula may be used to convert between the first and second currencies. According to one embodiment of the invention, the amount of second currency to be incremented is determined based upon a set of one or more conversion criteria. The set of one or more conversion criteria may be used to select a particular conversion formula. The invention is not limited to any particular conversion criteria and the conversion criteria may vary depending upon the requirements of a particular application. Example conversion criteria include, without limitation, one or more attributes of participant 202, one or more attributes of participant 204, one or more attributes of the transaction, a time at which participant 202 makes the request and which products or services are involved in the transaction.

One example attribute of participant 202 is a class of participant 202. For example, participant 202 may be classified as either a bronze, silver or gold class participant and the particular conversion formula applied is based upon the class of participant 202. Thus, if participant 202 is in the gold class, then a better conversion formula is applied than if participant 202 was in the bronze class, meaning that for a gold class participant, each unit of the first currency translates into a relatively greater number of units in the second currency. One example attribute of participant 204 is a class to which participant 204 belongs. For example, in the situation where participant 204 is a merchant, then participant 204 may belong to a particular class of merchants. In this situation, the particular conversion formula applied is based upon the class of merchants to which participant 204 belongs.

4. Atomic Transactions

According to one embodiment of the invention, the steps of decrementing an amount of the first currency and incrementing an amount of the second currency associated with participant 202 are performed as an atomic transaction. This means that either both steps are performed, or neither step is performed. This avoids creating an inconsistent result by performing only one of the steps. A variety of techniques may be used to decrement an amount of the first currency and increment an amount of the second currency as an atomic transaction and the invention is not limited to any particular approach. One example technique is "two phase commit." According to one embodiment of the invention, performing the aforementioned steps as an atomic transaction includes "freezing" the amount of the first currency associated with participant 202 that is decremented. According to one embodiment of the invention, frozen currency is either permanently deducted when the transaction is successfully completed, or is unfrozen if a determination is made that the transaction cannot be successfully completed.

Consider the following example. Participant 202 submits to intermediary 206 a request to purchase a widget from participant 204 using one hundred red points (first currency) that participant 202 has earned from the entity that controls red points. In response to receiving the request from participant 202, intermediary 206 freezes one hundred red points in first currency account 212. The one hundred red points in first currency account 212 that are frozen cannot be used for any other transaction. Intermediary 206 increments an amount in second currency account 214. In the present example, it is presumed that the second currency is USD. Intermediary applies a conversion of one hundred red points to USD and determines that second currency account 214 is to be incremented by ten USDs. The transaction is then processed using the ten USDs in second currency account 214. If the transaction is successfully processed, then the one hundred frozen red points in first currency account 212 are permanently deducted from first currency account 212. On the other hand, if the transaction cannot be successfully processed, then the one hundred frozen red points in currency account 212 are unfrozen and may be used for other transactions.

5. Implementation Mechanisms

The approach for processing transactions described herein may be implemented in a wide variety of applications and contexts. For example, any type of intermediary 206 may be used. The functions performed by intermediary 206 as described herein may be integrated into any type of transaction processing mechanism. Alternatively, intermediary 206 may be implemented as a stand-alone mechanism that interacts with other transaction processing mechanisms.

Figure 2B:
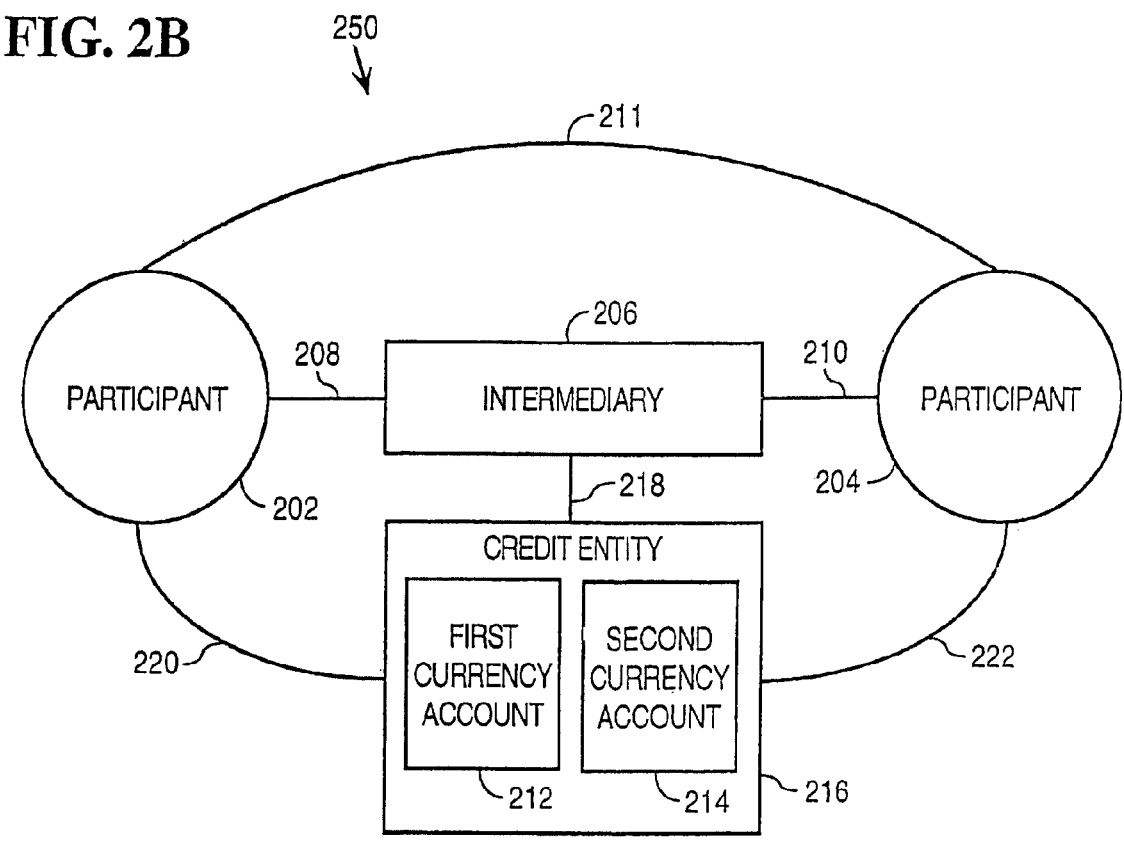
FIG. 2B is a block diagram of an arrangement for processing transactions according to another embodiment of the invention.

FIG. 2B is a block diagram of an arrangement 250 for processing transactions according to an embodiment of the invention. Arrangement 250 includes a credit entity 216 that is communicatively coupled to intermediary 206 via a communications link 218. Credit entity 216 is communicatively coupled to participants 202, 204 via communications links 220, 222, respectively. In this embodiment, credit entity 216 maintains first and second currency accounts 212, 214. Intermediary 206 processes requests from participant 202 and instructs credit entity 218 on the amount by which first currency account 212 is to be decremented and the amount by which second currency account 214 is to be incremented. Intermediary 206 may also instruct credit entity 216 regarding freezing and unfreezing amounts in first currency account 212. Intermediary 206 may also instruct credit entity 216 to permanently decrement frozen amounts from first currency account 212.

Participant 202 may communicate directly with credit entity 216 over communications link 220 regarding balances in first and second currency accounts 212, 214. Participant 222 may communicate directly with credit entity 216 over communications link 222 regarding the balance of second currency account 214, for example to receive payment in the second currency for a good or services purchased by participant 202 in the first currency.

The approach may be implemented in hardware circuitry, in computer software, or a combination of hardware circuitry and computer software and the invention is not limited to a particular hardware or software implementation.

Figure 3:
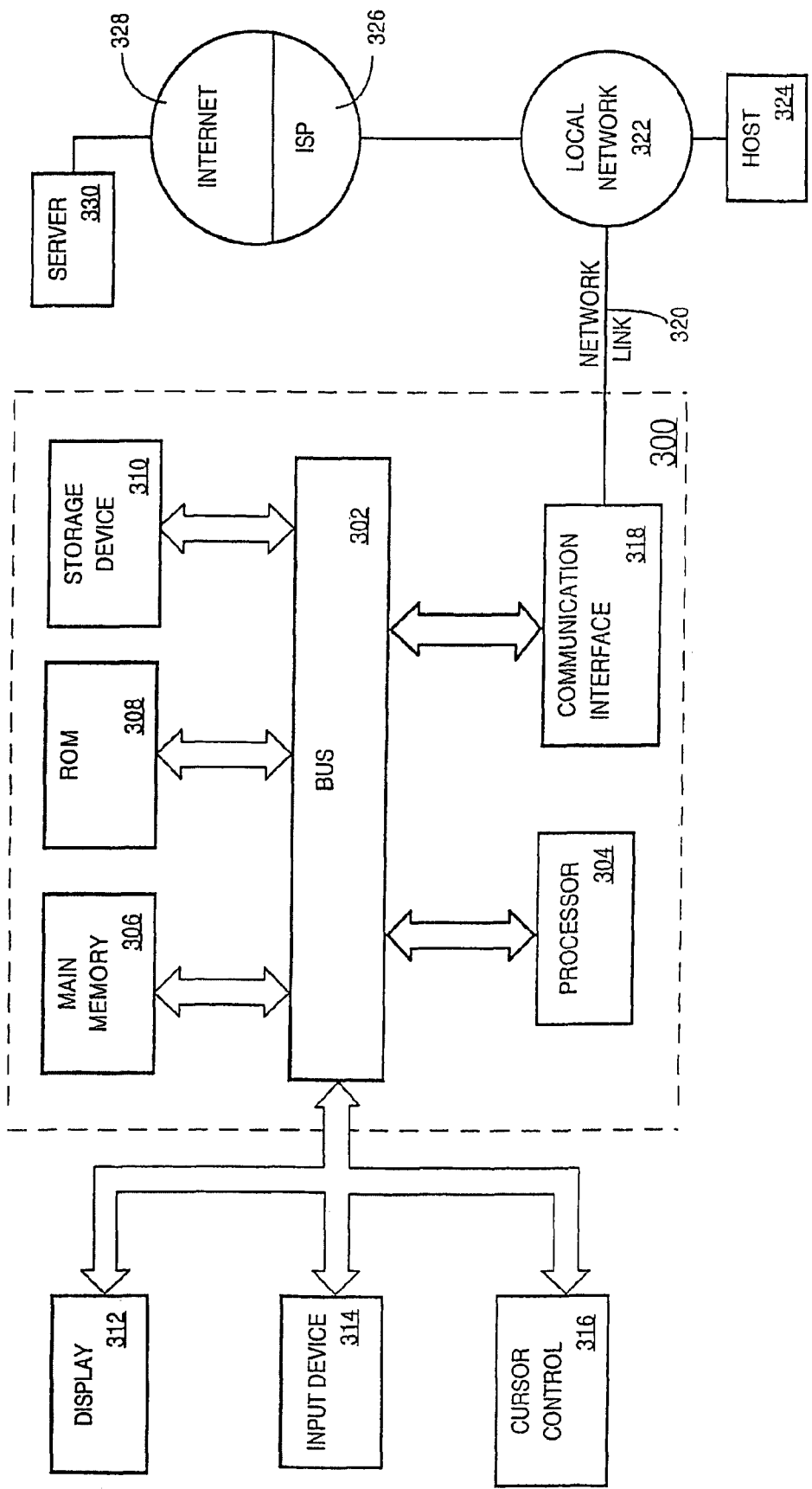
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for processing transactions. According to one embodiment of the invention, the processing of transactions is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for the processing of transactions as described herein.

The received code may be executed by processor 304 as it is received, and/or stored in storage device 310, or other non-volatile storage for later execution. In this manner, computer system 300 may obtain application code in the form of a carrier wave.

The approach described herein for processing transactions provides many advantages over prior approaches. First, the approach allows a participant to conduct a transaction using a currency that is not recognized by another participant. This is particularly beneficial for the many numbers of private currencies, e.g., award points, that are currently in use and that will be in use in the future. Moreover, the approach may be implemented transparent to all participants. This avoids participants having to invest significant financial and human labor resources to upgrade their transaction processing to support multiple currencies that may change very rapidly. Thus, the approach is ideally suited for use over communications networks, such as the Internet, where many proprietary, i.e., private, currencies are used.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A computer-implemented method for allowing a user to use private currency provided by a particular entity to make purchases from a vendor that does not recognize the private currency, the method comprising:

establishing, at an intermediary computer, a first account and a second account for the user, wherein the first account maintains an amount of the private currency that is not recognized by the vendor, and wherein the second account maintains an amount of second currency that is recognized by the vendor;

receiving, at the intermediary computer, a request to purchase a product or service from the vendor using at least a portion of the amount of the private currency;

determining, by the intermediary computer, at least a portion of the amount of second currency to be used to pay for at least part of the purchase based on an exchange formula;

decrementing, by the intermediary computer, the portion of the amount of the private currency from the first account and incrementing, by the intermediary computer, the determined portion of the amount of the second currency in the second account; and processing the purchase request using the determined portion of the amount of the second currency from the second account.

2. The computer-implemented method as recited in claim 1, further comprising:

selecting the exchange formula, at least in part, based on the time period during which the purchase is made.

3. The computer-implemented method as recited in claim 1, further comprising:

selecting the exchange formula, at least in part, based on the identity of the user.

4. The computer-implemented method as recited in claim 1, wherein the particular entity assigns users to classes, and the method further comprises:

selecting the exchange formula, at least in part, based on the class to which the entity has assigned the user.

5. The computer-implemented method as recited in claim 1, further comprising:

selecting the exchange formula, at least in part, based on the identity of the vendor.

6. The computer-implemented method as recited in claim 1, wherein the particular entity assigns vendors to classes, and the method further comprises:

selecting the exchange formula, at least in part, based on the class to which the entity has assigned the vendor.

7. The computer-implemented method as recited in claim 1, wherein the steps of decrementing the portion of the amount of the private currency from the first account and incrementing the determined portion of the amount of the second currency in the second account are performed as an atomic unit.

8. The computer-implemented method as recited in claim 1, wherein the steps of decrementing the portion of the amount of the private currency from the first account and incrementing the determined portion of the amount of the second currency in the second account are performed in response to receipt of confirmation of the purchase.

9. The computer-implemented method as recited in claim 1, further comprising:

receiving an indication that the user intends to make the purchase;

in response to the indication, putting at least a portion of the private currency in the first account in reserve;

receiving a confirmation of the purchase, in response to the confirmation, performing the step of decrementing, wherein the step of decrementing includes removing the portion that is on hold from the first account.

10. A computer-readable storage medium storing one or more computer-readable instructions for allowing a user to use private currency provided by a particular entity to make purchases from a vendor that does not recognize the private currency, the one or more instructions including instructions which, when executed by one or more processors, cause the one or more processors to:

establish, at an intermediary computer, a first account and a second account for the user, wherein the first account maintains an amount of the private currency that is not recognized by the vendor, and wherein the second account maintains an amount second currency that is recognized by the vendor;

determine, by the intermediary computer in response to a request to purchase a product or service from the vendor using at least a portion of the amount of the private currency, at least a portion of the amount of second currency to be used to pay for at least part of the purchase based on an exchange formula;

decrement, by the intermediary computer, the portion of the amount of the private currency from the first account and increment, by the intermediary computer, the determined portion of the amount of the second currency in the second account; and process the purchase request using the determined portion of the amount of the second currency from the second account.

11. The computer-readable storage medium as recited in claim 10, further comprising one or more additional instructions which, when executed by the one or more processors, cause the one or more processors to select the exchange formula, at least in part, based on the time period during which the purchase is made.

12. The computer-readable storage medium as recited in claim 10, further comprising one or more additional instructions which, when executed by the one or more processors, cause the one or more processors to select the exchange formula, at least in part, based on the identity of the user.

13. The computer-readable storage medium as recited in claim 10, wherein the particular entity assigns users to classes, and the computer-readable medium further comprises one or more additional instructions which, when executed by the one or more processors, cause the one or more processors to select the exchange formula, at least in part, based on the class to which the entity has assigned the user.

14. The computer-readable storage medium as recited in claim 10, further comprising one or more additional instructions which, when executed by the one or more processors, cause the one or more processors to select the exchange formula, at least in part, based on the identity of the vendor.

15. The computer-readable storage medium as recited in claim 10, wherein the particular entity assigns vendors to classes, and the computer-readable medium further comprises one or more additional instructions which, when executed by the one or more processors, cause the one or more processors to select the exchange formula, at least in part, based on the class to which the entity has assigned the vendor.

16. The computer-readable storage medium as recited in claim 10, wherein the steps of decrementing the portion of the amount of the private currency from the first account and incrementing the determined portion of the amount of the second currency in the second account are performed as an atomic unit.

17. The computer-readable storage medium as recited in claim 10, wherein the steps of decrementing the portion of the amount of the private currency from the first account and incrementing the determined portion of the amount of the second currency in the second account are performed in response to receipt of confirmation of the purchase.

18. The computer-readable storage medium as recited in claim 10, further comprising one or more additional instructions which, when executed by the one or more processors, cause the one or more processors to perform the steps of:
    putting at least a portion of the private currency in the first account in reserve in response to an indication that the user intends to make the purchase; and
    performing the step of decrementing in response to a confirmation of the purchase, wherein the step of decrementing includes removing the portion that is on hold from the first account.

19. The computer-readable storage medium as recited in claim 10, wherein the computer-readable storage medium comprises a non-volatile computer-readable storage medium.

20. The computer-readable storage medium as recited in claim 19, wherein the non-volatile computer-readable storage medium consists essentially of an optical disk.

21. The computer-readable storage medium as recited in claim 19, wherein the non-volatile computer-readable storage medium consists essentially of a magnetic disk.

22. The computer-readable storage medium as recited in claim 10, wherein the computer-readable storage medium comprises a volatile computer-readable storage medium.

23. The computer-readable storage medium as recited in claim 22, wherein the volatile computer-readable storage medium consists essentially of a dynamic memory.

* * * * *